US010645088B1

(12) United States Patent
Yanes et al.

(10) Patent No.: US 10,645,088 B1
(45) Date of Patent: May 5, 2020

(54) GENERIC UNIFIED PRESENCE DETECTION SYSTEM

(71) Applicant: Fuze, Inc., Boston, MA (US)

(72) Inventors: Leopoldo Yanes, Boston, MA (US); Alan Sapede, Boston, MA (US); Julio Viera, Boston, MA (US); Clément Wehrung, Boston, MA (US)

(73) Assignee: Fuze, Inc., Boston, MA (US)

( * ) Notice: Subject to any disclaimer, the term of this patent is extended or adjusted under 35 U.S.C. 154(b) by 169 days.

(21) Appl. No.: 15/943,644

(22) Filed: Apr. 2, 2018

(51) Int. Cl.
*G06F 15/173* (2006.01)
*H04L 29/06* (2006.01)
*H04L 29/08* (2006.01)

(52) U.S. Cl.
CPC .......... *H04L 63/102* (2013.01); *H04L 63/101* (2013.01); *H04L 63/126* (2013.01); *H04L 67/22* (2013.01); *H04L 67/24* (2013.01); *H04L 67/32* (2013.01)

(58) Field of Classification Search
CPC ......... H04W 4/90; H04W 4/029; H04W 4/02; H04W 4/80; H04W 16/28; H04W 12/08; H04W 16/26; H04L 67/306; H04L 67/22; H04L 67/24; H04L 67/12; H04L 67/26; H04L 41/12
See application file for complete search history.

(56) References Cited

U.S. PATENT DOCUMENTS

| 7,466,810 B1* | 12/2008 | Quon | H04M 3/42229 379/201.01 |
| 2005/0154698 A1* | 7/2005 | Ikezawa | H04L 67/24 |
| 2008/0189387 A1* | 8/2008 | Lee | H04L 51/04 709/217 |
| 2009/0077181 A1* | 3/2009 | Chen | G06Q 10/107 709/206 |
| 2012/0096088 A1* | 4/2012 | Fahmy | G06Q 10/10 709/204 |
| 2013/0072153 A1* | 3/2013 | Lawson | H04L 63/10 455/410 |
| 2014/0173002 A1* | 6/2014 | Frederick | H04W 12/06 709/206 |
| 2014/0222604 A1* | 8/2014 | Yellapragada | G06Q 30/0601 705/26.1 |

\* cited by examiner

*Primary Examiner* — Michael A Keller
*Assistant Examiner* — Thao D Duong
(74) *Attorney, Agent, or Firm* — McDermott, Will & Emery LLP (57) ABSTRACT

A method for receiving a first signal from a first client device, the first signal indicative of a first user activity is provided. The method includes receiving a second signal from a client device, and storing the first signal and the second signal in an activity history log associated with the first user. The method includes determining, by a server, a presence status of the first user, configuring a presence indicator for the first user based on the presence status, and receiving, from a second user, a request for the presence indicator for the first user. The method includes validating the request from the second user and providing the presence indicator for the first user to the second user. A system and a non-transitory, computer readable medium storing instructions to perform the above method are also provided.

20 Claims, 8 Drawing Sheets

GENERIC UNIFIED PRESENCE DETECTION SYSTEM

BACKGROUND

Field

The present disclosure generally relates to network applications and management of multiple users and the communication channels therebetween. More specifically, the present disclosure relates to presence detection and status sharing for users in a networked system such that a first user may efficiently determine the availability of a second user for a network collaboration.

Description of the Related Art

Commonly and historically, user presence information in unified communication platforms is stored as a unique value per user, or else the platform itself is unaware of a user's current state on the different modalities or devices of the platform. Therefore, presence information relies on each modality or device broadcasting state changes individually, on demand (e.g., by a user request). As a result, the presence state is typically overwritten by the device or platform modality changing the user's presence. This not only limits the level of detail that can be stored in the presence field, but also limits the ability to produce a single, accurate representation of the user state based on the activities performed in the different modalities or devices of the platform, at any time.

SUMMARY

In one embodiment of the present disclosure, a computer-implemented method is described for receiving a first signal from a first client device, the first signal indicative of a first activity of a first user associated with the first client device. The computer-implemented method includes receiving a second signal from a second client device, the second signal indicative of a second activity of the first user associated with the second client device, storing the first signal and the second signal in an activity history log associated with the first user, and determining, by a server, a presence status of the first user based on an analysis of the activity history log. The computer-implemented method also includes configuring a presence indicator for the first user based on the presence status and receiving, from a second user, a request for the presence indicator for the first user. The computer-implemented method also includes validating the request from the second user and providing the presence indicator for the first user to the second user when the request is validated.

According to one embodiment, a system is described that includes one or more processors and a memory coupled to the one or more processors, the memory including instructions that, when executed by the one or more processors, cause the one or more processors to receive a first signal from a first client device, the first signal indicative of a first activity of a first user associated with the first client device. The one or more processors execute instructions to receive a second signal from a second client device, the second signal indicative of a second activity of the first user associated with the second client device, to store the first signal and the second signal in an activity history log associated with the first user, and to determine, by a server, a presence status of the first user based on an analysis of the activity history log. The one or more processors also execute instructions to configure a presence indicator for the first user based on the presence status, and to receive, from a second user, a request for the presence indicator for the first user. The one or more processors also execute instructions to validate the request from the second user and to provide the presence indicator for the first user to the second user when the request is validated.

In one embodiment of the present disclosure, a computer-implemented method is described for incorporating, by a first user through a first communication platform, a second user in a list of contacts for display. The computer-implemented method includes requesting, to a server, a presence indicator for the second user, communicating, through a second communication platform, with the second user based on the presence indicator, and updating the list of contacts for display when the request for the presence indicator is rejected by the server, wherein the second communication platform is independent from the first communication platform.

According to one embodiment, a non-transitory, machine readable medium is described that includes instructions, which when executed by one or more processors, cause a computer to perform a method for receiving a first signal from a first client device, the first signal indicative of a first activity of a first user associated with the first client device. The method includes receiving a second signal from a second client device, the second signal indicative of a second activity of the first user associated with the second client device, storing the first signal and the second signal in an activity history log associated with the first user, and determining, by a server, a presence status of the first user based on an analysis of the activity history log. The method also includes configuring a presence indicator for the first user based on the presence status, receiving, from a second user, a request for the presence indicator for the first user, validating the request from the second user, and providing the presence indicator for the first user to the second user when the request is validated.

In yet another embodiment, a system is described that includes a means for storing commands and a means for executing the commands causing the system to perform a method including incorporating, by a first user through a first communication platform, a second user in a list of contacts for display. The method also includes requesting, to a server, a presence indicator for the second user, communicating, through a second communication platform, with the second user based on the presence indicator, and updating the list of contacts for display when the request for the presence indicator is rejected by the server, wherein the second communication platform is independent from the first communication platform.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

General Overview

Presence management is a key service for unified communication platforms. Existing presence solutions were conceived and designed in environments where users mostly used one device at a time (e.g. a computer, or a desk phone). By extension, such solutions grew to handle multi-device concurrency using simplistic static chronological determinations such that the last seen or active device would override any existing inactive or active state for a given user. Accordingly, embodiments as disclosed herein address the modern concurrency constraints imposed on unified communication platforms by keeping track of a users' ongoing simultaneous activity on multiple devices (e.g. desktop, mobile, desk phone) and in multiple modalities of a platform (e.g. phone call, meeting, chat, or remote logging).

The disclosed system addresses the problem specifically arising in the realm of computer technology by providing a solution also rooted in computer technology, namely, by considering a presence detection engine that receives and aggregates presence signals from multiple devices associated with multiple users in a unified communication platform.

The disclosure includes a generic unified user presence platform that aggregates persistent signals from other systems, devices or platforms. In some embodiments, a presence detection engine stores, processes and combines these signals to determine and present a single, aggregated computed presence state of a given user to a second user, per request, or to multiple other users, by default.

Embodiments as disclosed herein also provide methods and systems to store and process presence information of multiple users over an extended period of time. Different communication modalities may report one or more activities to the presence detection engine, which stores, aggregates and combines the detected activities and produces a single, unified and consistent computed presence state. In some embodiments, the displayed presence state can be overridden by the user, upon direct intervention, but not automatically by a single device or modality in the platform.

Accordingly, embodiments as disclosed herein provide consistent, idempotent (e.g., applicable to multiple users), and predictable presence states. Further, embodiments as disclosed herein may be extended to new modalities or devices in a communication platform because the relation between the different modalities is defined in the presence detection engine, independently from the modalities or devices used.

Example System Architecture

Figure 1:
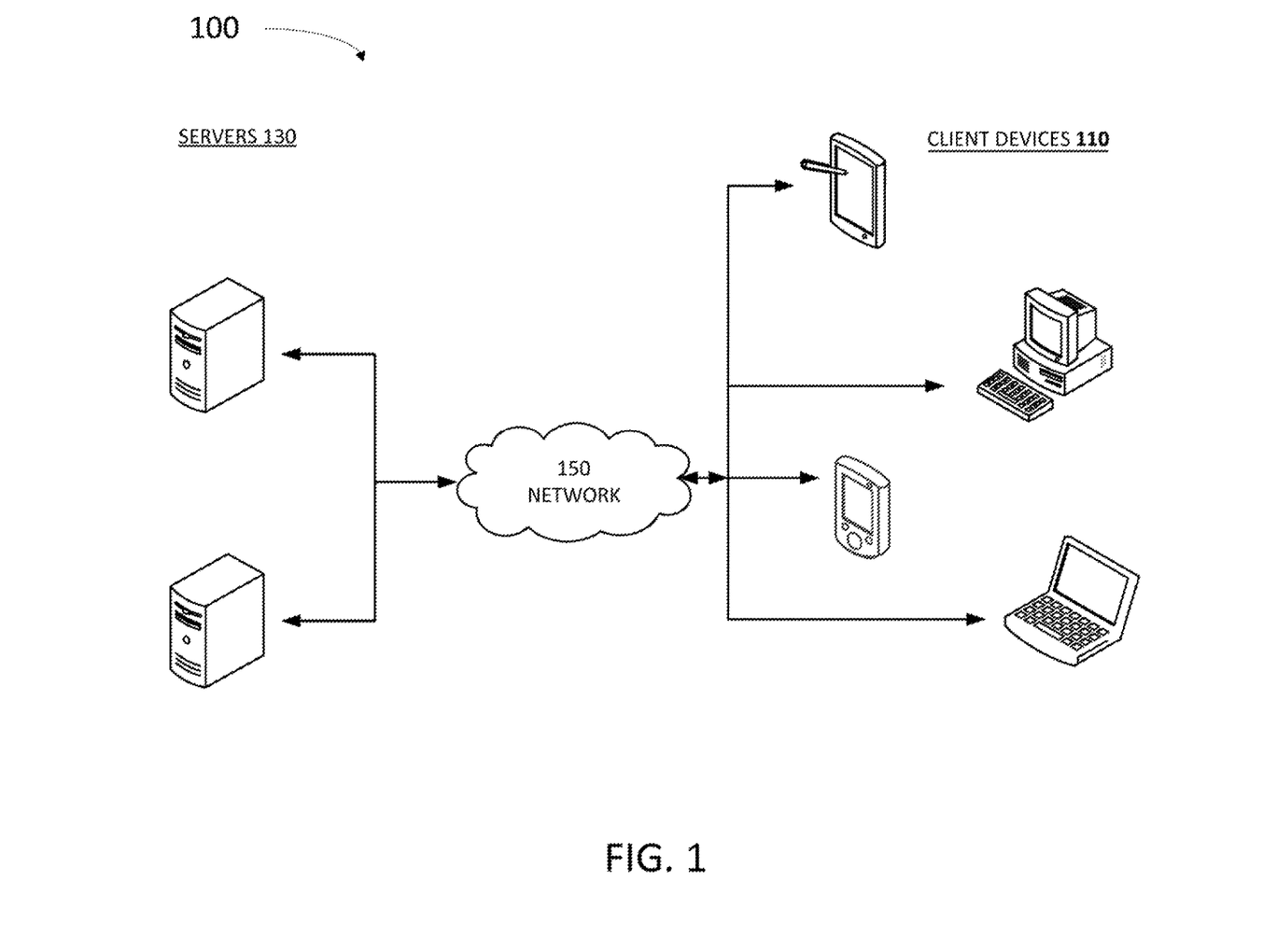
FIG. 1 illustrates an example architecture suitable to provide a platform for a presence detection, according to some embodiments.

FIG. 1 illustrates an example architecture 100 suitable to provide a platform for a presence detection, according to some embodiments. Architecture 100 includes servers 130 and client devices 110 connected over a network 150. One of the many servers 130 is configured to host a memory including instructions which, when executed by a processor, cause server 130 to perform at least some of the steps in methods as disclosed herein. In some embodiments, the processor in server 130 is configured to host a presence detection that a participant may access through client device 110. Further, in some embodiments, the processor in server 130 is configured to provide support for collaborative network event applications, and other networking applications such as text messaging services and the like, to a participant in a presence detection through client device 110. Information related to, and instructions to handle the presence detection may be stored in a presence detection engine accessible by a participant through a client device 110 (e.g., accessible through a web page or an application running on client device 110). Servers 130 can return images, documents, rich-text documents and the like intended for a shared use and modification by multiple participants in a presence detection system as disclosed herein. For purposes of load balancing, multiple servers 130 can host memories including instructions to one or more processors and multiple servers 130 for hosting one or more presence detections as disclosed herein.

Servers 130 may include any device having an appropriate processor, memory, and communications capability for hosting the documents and applications associated with the presence detection engine. The presence detection engine may be accessible by multiple participants through various client devices 110 over the network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing the presence detection engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
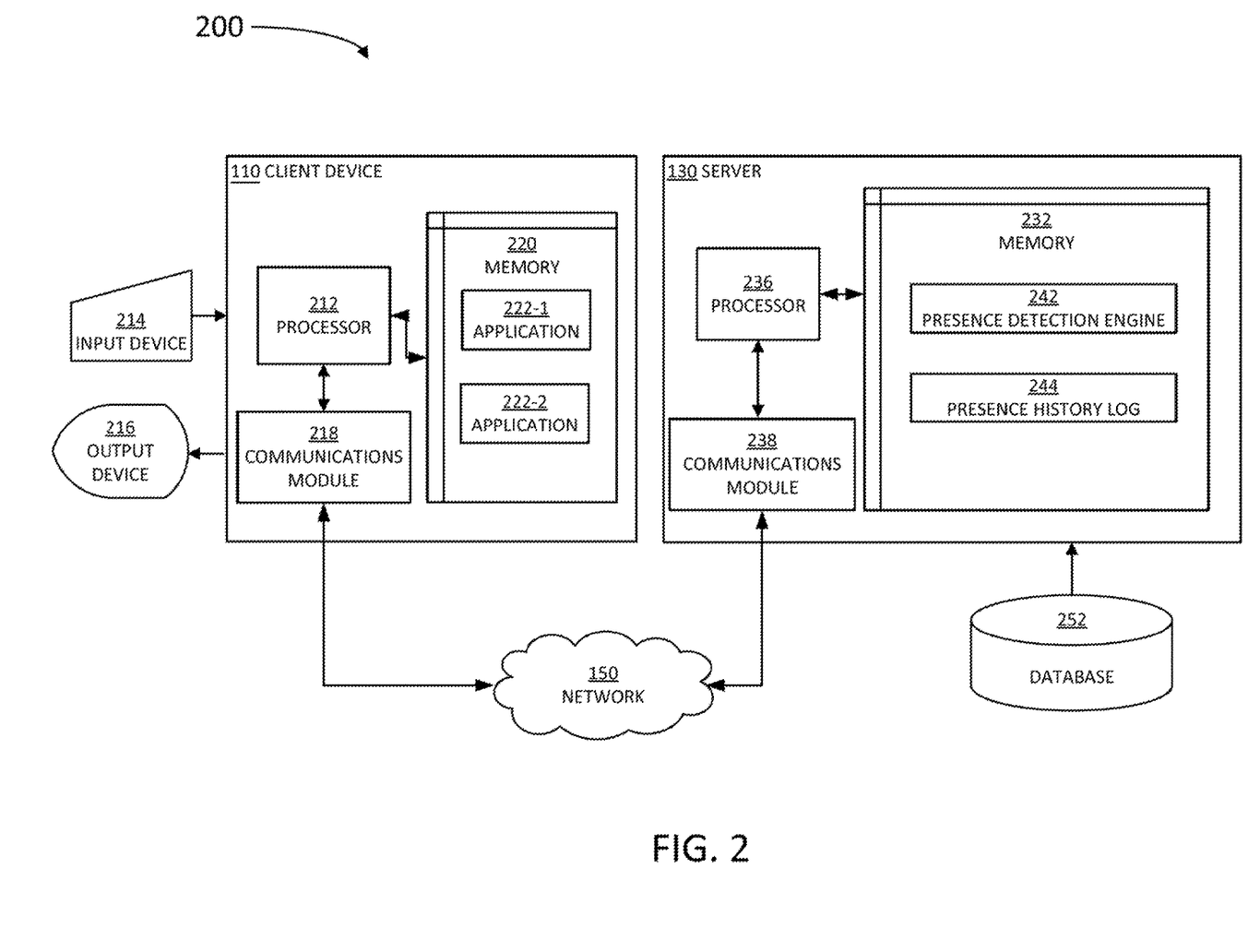
FIG. 2 is a block diagram illustrating an example server and client from the architecture of FIG. 1 according to certain aspects of the disclosure.

FIG. 2 is a block diagram 200 illustrating an example server 130 and client device 110 in the architecture 100 of FIG. 1 according to certain aspects of the disclosure. Client device 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Client device 110 may be any one of a desktop computer, a laptop, or a mobile computing device. Client device 110 may include a processor 212 and a memory 220. An input device 214 and an output device 216 enable the user to interact with client device 110. Examples of input device 214 and output device 216 may include a mouse, a keyboard, a display, a touch-interactive display, and the like.

Processor 236 is configured to execute instructions, such as instructions physically coded into processor 236, instructions received from software in memory 232, or a combination of both. A user of client device 110 may use input device 214 to submit a document or a media file to presence detection engine 242 via a user interface of application 222. The document submitted by the user may be include an application-based document (e.g., a text-rich document such as a Word, document, a PDF document, or any other document accessible through a text editing application, including a computer code sequence, and the like), a spreadsheet document (e.g., Excel and the like), a presentation document (e.g., Power Point and the like), an XML file, an HTML file or a multi-media file such as a video, audio, image file, or any combination of the above.

Server 130 includes a memory 232, a processor 236, and communications module 238. The user interface is displayed for the user in an output device 216 of client device 110. Memory 232 includes a presence detection engine 242 and a database 252. Presence detection engine 242 includes instructions which, when executed by processor 236, cause server 130 to perform at least partially steps as disclosed herein. In some embodiments, presence detection engine 242 includes instructions to communicate with an application 222-1 to detect the presence of the user of client device 110. In some embodiments, to detect the presence of the user of client device 110 may include to determine that the user of client device 110 is communicatively coupled and active with server 130. Presence detection engine 242 may also include instructions to store the presence information in a presence history log 244, and to store data related to a presence detection of multiple users into database 252. Furthermore, in some embodiments, presence detection engine 242 may include instructions to retrieve and provide to one or more users of the presence detection system at least some of the data in database 252 associated with a different user. For example, a first user may execute a second application 222-2 in client device 110, wherein application 222-2 may request presence detection engine 242 for a presence status of a second user. Presence detection engine 242 provides the presence status of the second user to the first user for display in output device 216 on a display associated with the execution of application 222-2. Applications 222-1 and 222-2 may be the same application, or different, unrelated applications, and will be collectively referred to, hereinafter, as "applications 222."

In some embodiments application 222-1 is configured to run in the background, while application 222-2 is on display at output device 216. For example, application 222-2 may be a networking, collaborative event application that a first user of client device 110 is running to participate in a network event. The first user may desire to find out the presence status of a second user, to communicate with the second user through application 222-2, or through other channels (e.g., a separate phone call, e-mail, or messaging). Application 222-1, running in the client device of the second user then provides the presence information to server 130, and presence detection engine 242 provides the presence status of the second user to the first user in application 222-2 of client device 110. Likewise, application 222-1, running in client device 110 for the first user, provides a presence signal to server 130 which, through presence detection engine 242, configures a presence indicator for the first user and provides the presence indicator to other users, upon request.

The user may access presence detection engine 242 through application 222 installed in memory 220 of client device 110. The user may also access presence detection engine 242 via a web browser installed in client device 110. Execution of application 222 may be controlled by a processor 212 in client device 110. In some embodiments, application 222 is downloaded and installed by the user into client device 110, from server 130.

Figure 3:
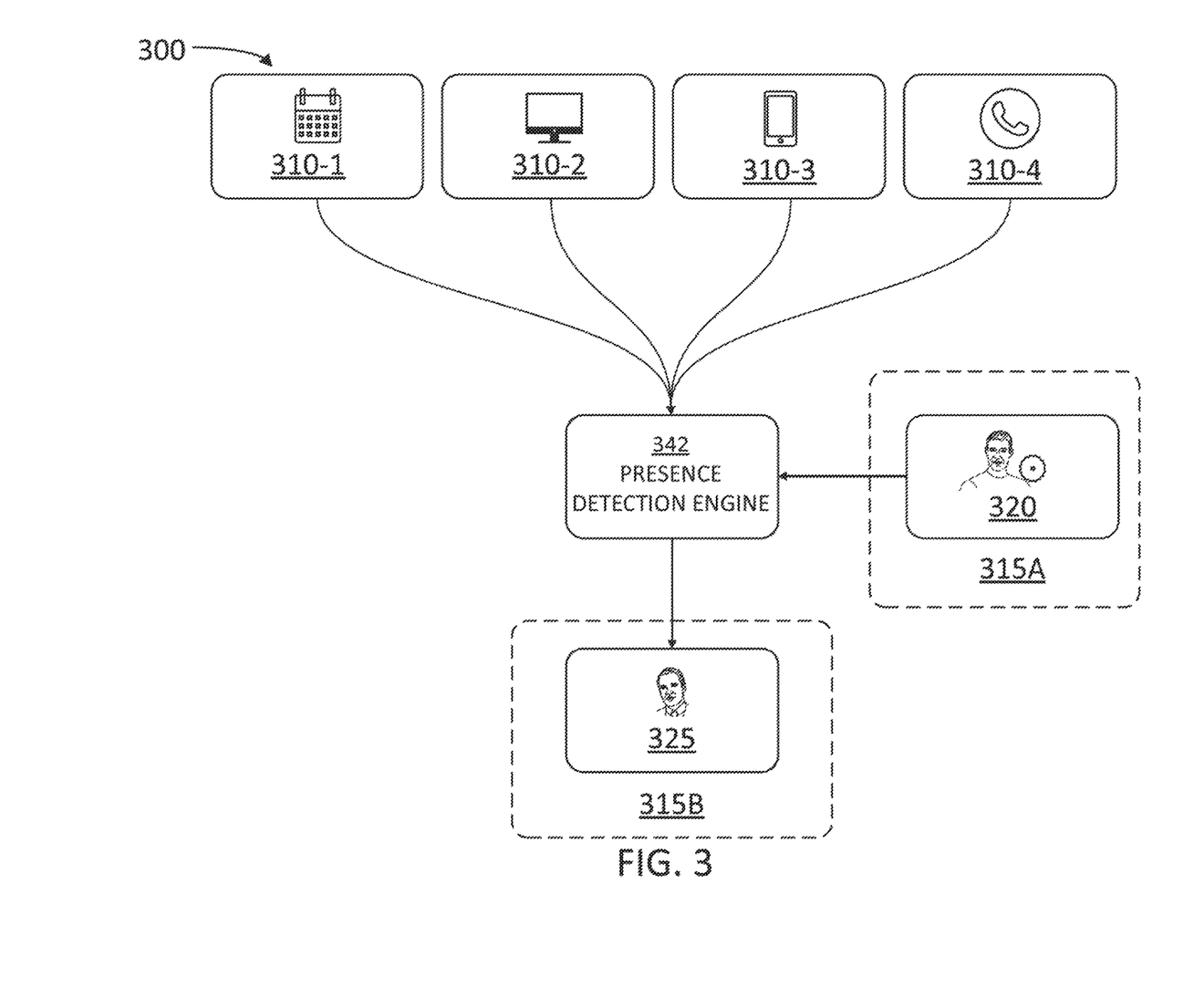
FIG. 3 illustrates the integration of a presence detection system, according to some embodiments.

FIG. 3 illustrates the integration of a presence detection system 300, according to some embodiments. Accordingly, a presence detection engine 342 is configured to receive a signal from either one of client devices 310-1, 310-2, 310-3, or 310-4 (hereinafter, collectively referred to as "client devices 310"). For illustrative purposes only, client device 310-1 may include a calendar server (e.g., server 130) that provides a calendar state to presence detection engine 342. Client device 310-2 may include a desktop computer that provides a desktop state to presence detection engine 342. Client device 310-3 may include a mobile device that provides a mobile state to presence detection engine 342. Client device 310-4 may include a desk phone that provides a desk phone state to presence detection engine 342.

Client devices 310 may be registered in presence detection system 300 through presence detection engine 342. In some embodiments, the user of client devices 310 registers each device with presence detection engine 342 as a choice. In some embodiments, client devices 310 are automatically registered with presence detection engine 342 at the time the devices are placed in service. In that regard, a first user may be associated with multiple client devices 310. More generally, client devices 310 are associated with one or multiple users.

In some embodiments, at least one of client devices 310 may use a second communication platform that is different from a first communication platform used by other client devices 310. For example, the second communication platform may be independent of the first communication platform, wherein the first communication platform hosts presence detection engine 342. Accordingly, the second communication platform may be hosted by a different server than the server hosting presence detection engine 342. In some embodiments, the user of client devices 310 may not be registered with the server hosting the second communication platform. Rather, in some embodiments the user of client devices 310 may be contacted (through one or more of client devices 310), by a user that is registered with the server hosting the second communication platform. In such embodiments, presence detection engine 342 is still able to add the user interaction to the presence history log (e.g., presence history log 244). In that regard, presence detection engine 342 receives a direct flow of data from phone call servers and raw data sources, and also from communication services themselves, to which a user may be subscribed.

Presence detection engine 342 configures a presence indicator 325 based on the aggregated information received from the multiple client devices 310. Client devices 310 may include any number of devices and applications associated with a user, such as a computer application, a mobile phone application, a desk phone and a calendar application. More generally, the number of client devices 310 is not limiting of embodiments consistent with the present disclosure. For example, rather than four, many more devices and applications may be included, or only one, according to system configurations, user status, and the like. In some embodiments, presence indicator 325 includes presence information regarding a first user with a first client device 310A. In some embodiments, client device 315A may include any one of client devices 310. Presence indicator 325 may be provided to a second user with a second client device 315B. The information in presence indicator 325 may include presence status for the first user on one or more of client devices 310. For example, the first user may be busy in a meeting (calendar state from calendar server 310-1), and also attending a call or sending a message through mobile device 310-3 (mobile state). In that regard, presence detection engine 342 may issue multiple presence indicators 325, one for each, or at least some, of multiple users registered with presence detection system 300. Further, presence indicators 325 may be issued to any one of the users registered with presence detection system 300, upon request or automatically. Moreover, presence detection engine 342 may incorporate presence indicator 325 in a presence history log, and store the presence history log in a database (e.g., presence history log 244 and database 252). In some embodiments, presence detection engine 342 configures presence indicator 325 even when the client device 310 is active through the second communication platform independent from the host of presence detection engine 342 (e.g., the first communication platform). For example, when a user registered with the second communication platform calls, chats, or sends an e-mail to the user of client device 310 through the second communication platform, presence detection engine 342 is able to log in the call, the chat request, or the e-mail in the presence history log.

In some embodiments, presence detection engine 342 receives from one or more of the users registered with presence detection system 300 (e.g., from the first user with client device 315A), a user preference 320. In some embodiments, user preference 320 may include a presence status item that a first user desires to be displayed for the other users by presence detection engine 342 when configuring presence indicator 325 for the first user. User preference 320 may include a desired format and features to be included in presence indicator 325 for the first user that will be provided to a second user. For example, in some embodiments a first user may desire to be shown as "busy" or "free and available" in the presence indicator 325, regardless of the state of any one of devices 310, and include these features in user preference 320.

Figure 4:
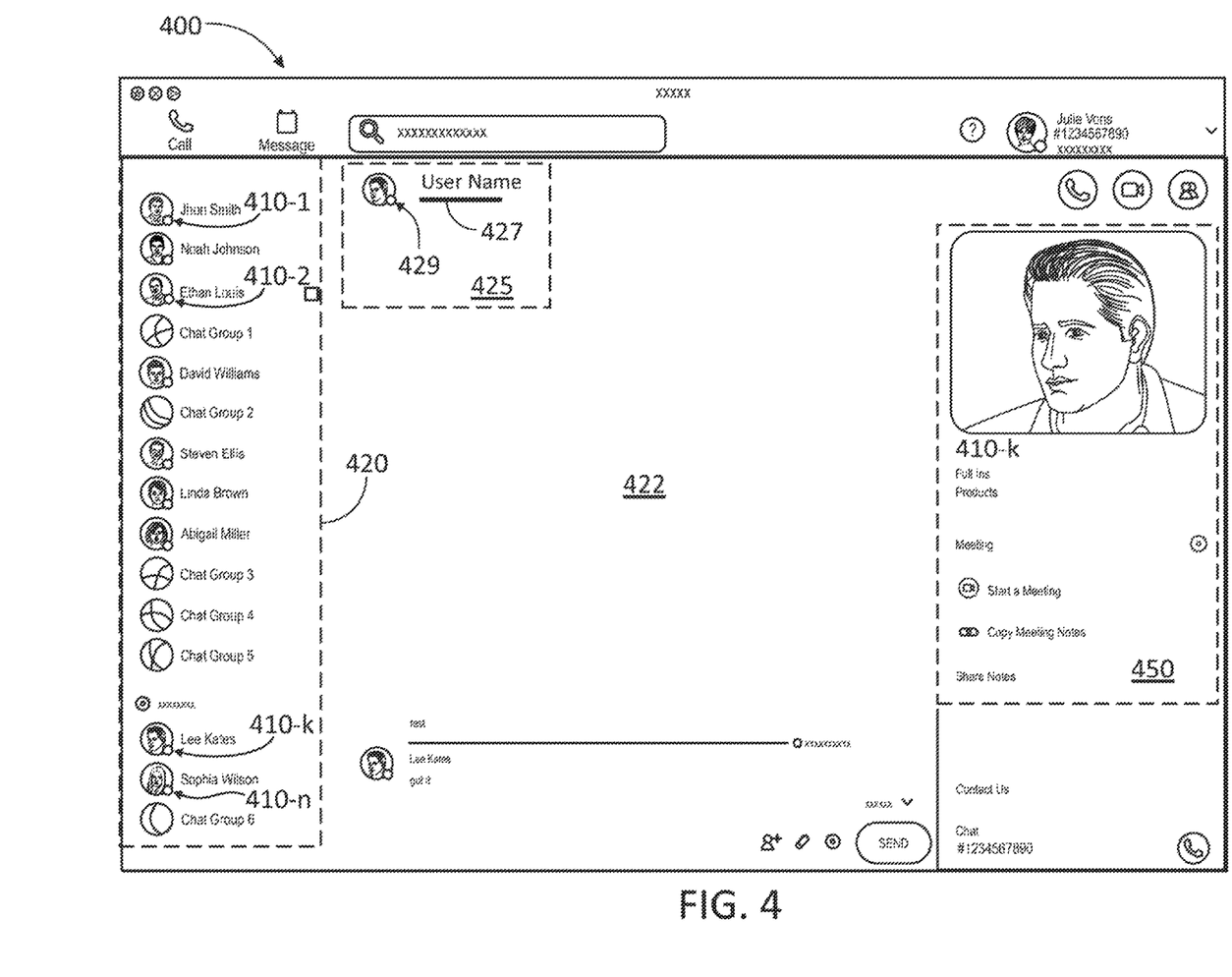
FIG. 4 illustrates a display layout of a presence detection system, according to some embodiments.

FIG. 4 illustrates a display layout 400 of a presence detection system in a client device, according to some embodiments. The presence detection system may include an application 422 hosted in the client device (e.g., applications 222 in client device 110). Application 422 may include a group event application (e.g., application 222-2) wherein multiple users 410-1, 410-2, through 410-n, including user 410-k (hereinafter, collectively referred to as users 410) in a contact list 420 may participate (e.g. in a network collaboration).

A remote server may provide information regarding presence status of users 410 to application 422 in a presence indicator 425, through a presence detection engine, as disclosed herein (e.g., presence detection engines 242 and 342). Presence indicator 425 may include a presence descriptor 427, a user name (e.g., "user 410-k"), and a quick icon identifier 429. Quick icon identifier 429 may be simply a dot colored in a manner that quickly identifies the status of user 410-k to all other participants in the collaborative event held by application 422 (e.g., red, for "busy," green, for "free and available," yellow for "present but unresponsive," and the like). In some embodiments, presence descriptor 427 may be modified by user 410-k accordingly. In some embodiments, presence descriptor 427 is automatically set based on information collected by the presence detection engine. In some embodiments, application 422 may feature user 410-k in a separate field 450, when the user of the client device taps, or selects, user 410-k from contact list 420.

In some embodiments presence descriptor 427 may provide some context as to the current activity of user 410-k. For example, in some embodiments the presence detection system may couple with a business productivity tool to include text such as "working on Project No. XYZ" in presence descriptor 427. In some embodiments the presence detection system may couple with device location features in a mobile device (e.g., a smartphone and the like) to indicate a device/hardware based presence status to include text such as "Do Not Disturb (DND)" (e.g., when a smartphone is placed facing down), or "Driving, available for calls only" (e.g., when user 410-k is driving in a car with a smartphone), in presence descriptor 427. In some embodiments, the presence detection system may couple with an automated location system in the workplace (e.g., conference room presence detection system) to include text such as "Currently in headquarters (HQ)," "Currently in Louvre (conference) Room," in presence descriptor 427.

Figure 5:
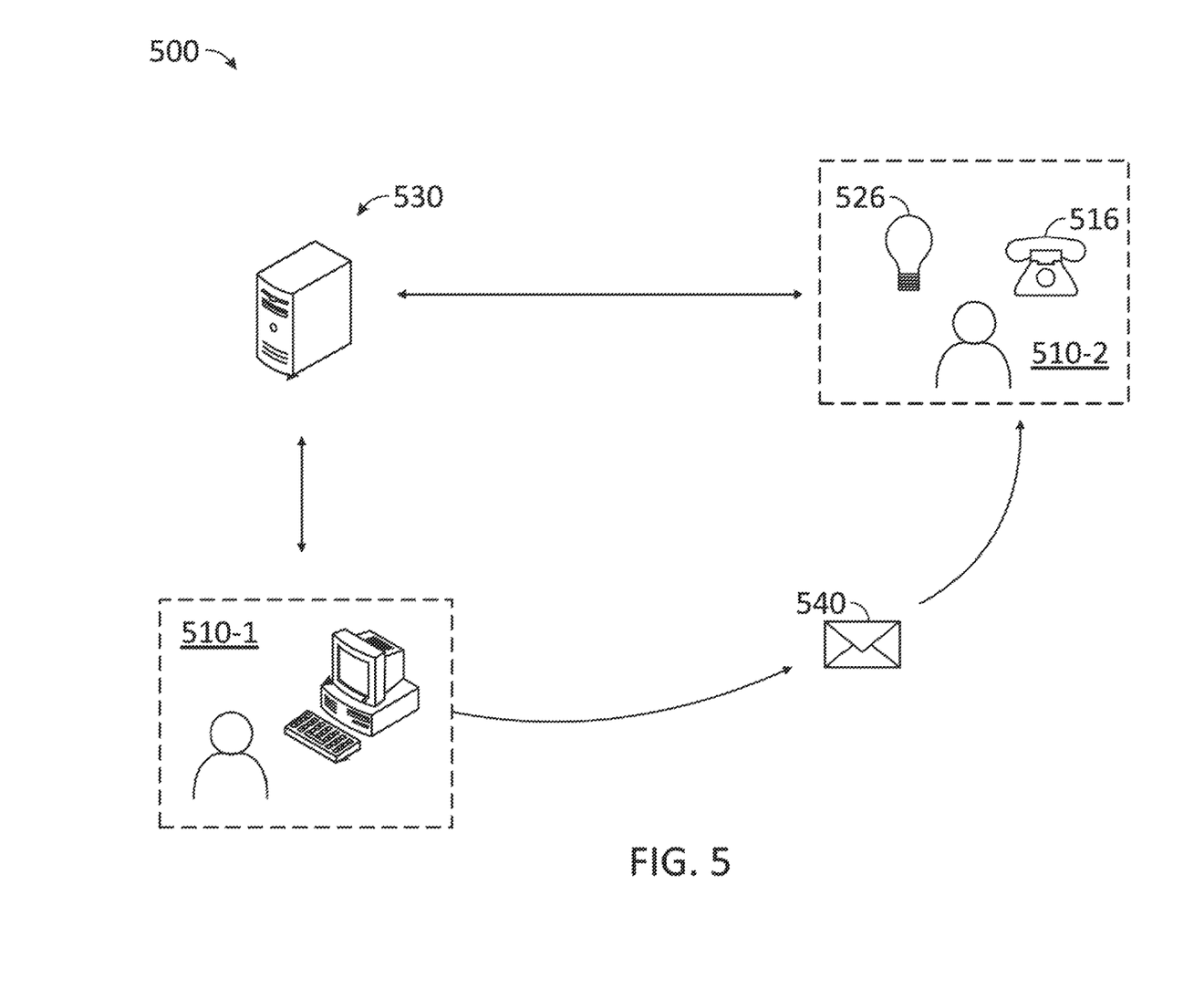
FIG. 5 is a walkthrough illustration of an interaction between users including a presence detection server, according to some embodiments.

FIG. 5 is a walkthrough illustration of an interaction 500 between first user 510-1 and second user 510-2 (hereinafter, collectively referred to as "users 510") including a presence detection server 530, according to some embodiments. Users 510 may be remotely located and yet still able to communicate with detection server 530 and with each other through a network (e.g., network 150). Moreover, users 510 may in fact be remote server systems wherein each of users 510 may be registered independently. Accordingly, a server handling each of users 510 may provide the presence information to presence detection server 530. In some embodiments, users 510 may be located in different time zones, and presence detection server 530 is time zone-aware. Accordingly, presence detection server 530 may provide personalized notification behaviors or transparency between users 510 according to the time zone detected for each of users 510 (e.g., during business hours, and the like).

Based on the presence status of second user 510-2, first user 510-1 may decide to send a communication 540 to second user 510-2 (e.g., via an e-mail, and the like). In some embodiments, first user 510-1 also determines the type of communication 540 to use for contacting second user 510-2, based on the presence information. For example, first user 510-1 may learn from presence detection server 530 that second user 510-2 is on a desk phone 516, and therefore first server 510-1 may decide to send communication 540 to second user 510-2 in the form of an e-mail message that may cause little to no disruption to the activities of second user 510-2. In some embodiments, presence detection server 530 determines that second user 510-2 is busy on desk phone 516 even when desk phone uses a communication platform different than the communication platform used by presence detection server 530 and users 510.

In some embodiments, users 510 may be closely located to one another (within physical reach, e.g., co-workers in an office, a cubicle, a plant, and the like). In such case, presence indicator may be a light bulb 526 that turns on with a coded color, to indicate the presence status of second user 510-2 (e.g., red, green and yellow, as mentioned above).

Figure 6:
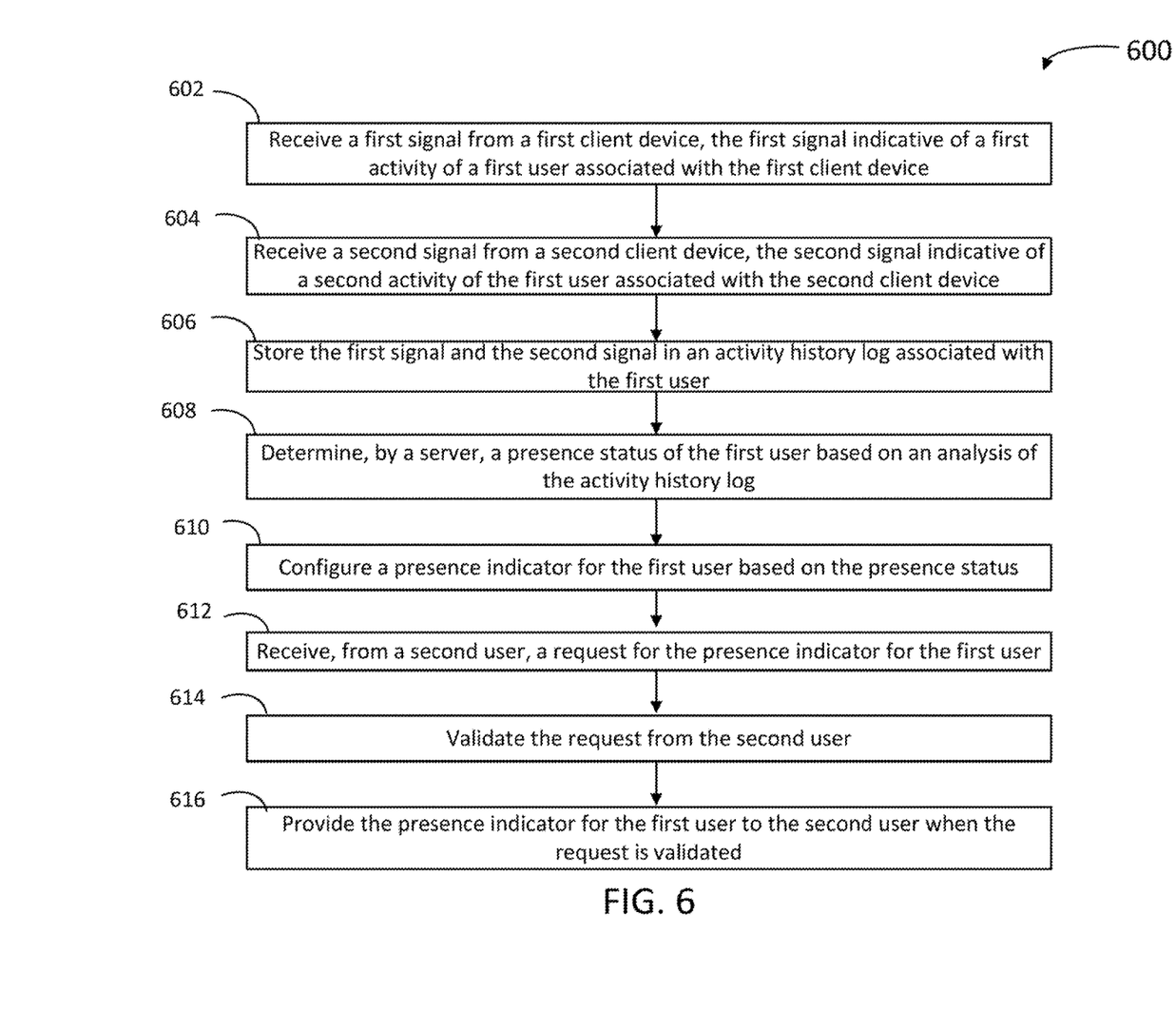
FIG. 6 is a flowchart illustrating steps in a method for hosting a presence detection in a server, according to some embodiments.

FIG. 6 is a flowchart illustrating steps in a method 600 for hosting a presence detection in a server, according to some embodiments. Method 600 may be performed at least partially by any one of the network servers hosting a presence detection engine (e.g., presence detection engine 242), while communicating with any one of a plurality of client devices (e.g., servers 130 and client devices 110). At least some of the steps in method 600 may be performed by a computer having a processor executing commands stored in a memory of the computer (e.g., processors 212 and 236, memories 220 and 232). For example, at least some of the commands may be included in an application installed in a client device accessible by a user (e.g., application 222). Further, steps as disclosed in method 600 may include retrieving, editing, and/or storing files in a database that is part of, or is communicably coupled to, the computer (e.g., presence history log 244, database 252). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes receiving a first signal from a first client device, the first signal indicative of a first activity of a first user associated with the first client device. In some embodiments, step 602 includes requesting the signal from multiple client devices associated with the first user, including the first client device. In some embodiments, step 602 includes detecting the presence of the first user, based on the signal from the first client device. In some embodiments, the first client device is part of a first communication platform, and step 602 includes using a second communication platform independent from the first communication platform. In some embodiments, the first client device is registered with a first communication platform and the second client device is not registered with the first communication platform, and step 602 includes identifying the second signal in the activity history log. For example, in some embodiments the first user receives a phone call from a second user through a second communication platform that the first user is not registered in. The second communication platform may still be able to access the first user telephone number, in which case the telephone conversation may be logged by the first communication platform.

Step 604 includes receiving a second signal from a second client device, the second signal indicative of a second activity of the first user associated with the second client device. For example, step 604 may include receiving a chat signal from a smart phone associated with the first user, the smart phone running a chat application that enables the first user to chat with a second user. In some embodiments, step 604 is repeated for a third, fourth, and any number of client devices. Accordingly, there is no limit on the number of client devices associated with the first user. Moreover, in some embodiments step 604 may be omitted and a presence status of the first user may be calculated with the information of the first client device.

Step 606 includes storing the first signal and the second signal in an activity history log associated with the first user. In some embodiments, the activity history log includes a user communication history information from multiple communication platforms associated with the first user, and step 606 further includes updating an entry for a communication platform in the activity history log with the first signal from the first client device. For example, in some embodiments step 606 may include updating the activity history log with a chat request received in a second communication device for the first user, from a second user through a second communication platform independent from the first communication platform. Step 608 includes determining, by the server, a presence status of the first user based on an analysis of the activity history log.

Step 610 includes configuring a presence indicator for the first user based on the presence of the first user and on the presence history log. In some embodiments, the presence history log comprises information from multiple client devices associated with the first user. Accordingly, step 610 may further include updating an entry for the first user in the presence history log with the signal from the first client device. In some embodiments, step 610 includes determining a time lapse since the first user last updated a presence status. In some embodiments, step 610 includes incorporating a type of the first client device in the presence indicator. In some embodiments, step 610 includes incorporating a presence status for multiple client devices associates with the first user. In some embodiments, at least one of the first signal and the second signal includes a communication transaction selected from one of a start communication, an end communication, or a transfer communication, and step 610 further includes determining a presence status based on the communication transaction. In some embodiments the first signal includes a presence information and the second signal includes a communication transaction, and step 610 includes configuring the presence indicator after identifying the communication transaction. In some embodiments, step 610 includes determining a time lapse since the first user last updated a presence status.

Step 612 includes receiving, from a second user, a request for the presence indicator for the first user.

Step 614 includes validating the request from the second user. In some embodiments, step 614 includes verifying that the second user is associated with the first user in a collaboration list stored in a database, and verifying that the second user is authorized to request the presence indicator for the first user. In some embodiments, step 614 includes requesting by the second user, through a subscription mechanism, to be notified to any or specific type of changes in the first user presence/availability status.

Step 616 includes providing the presence indicator for the first user to the second user when the request is validated. In some embodiments, step 616 includes receiving a second signal from a second client device, the second signal indicative of the presence of the first user associated with the second client device. In some embodiments, step 616 includes requesting the signal from the first client device when the second user requests the presence indicator. In some embodiments, step 616 includes updating a first user presence status in the presence history log. In some embodiments, step 616 further includes requesting the first signal from the first client device when the second user requests the presence indicator. In some embodiments, step 616 further includes updating a first user presence status in the activity history log based on the presence indicator.

Figure 7:
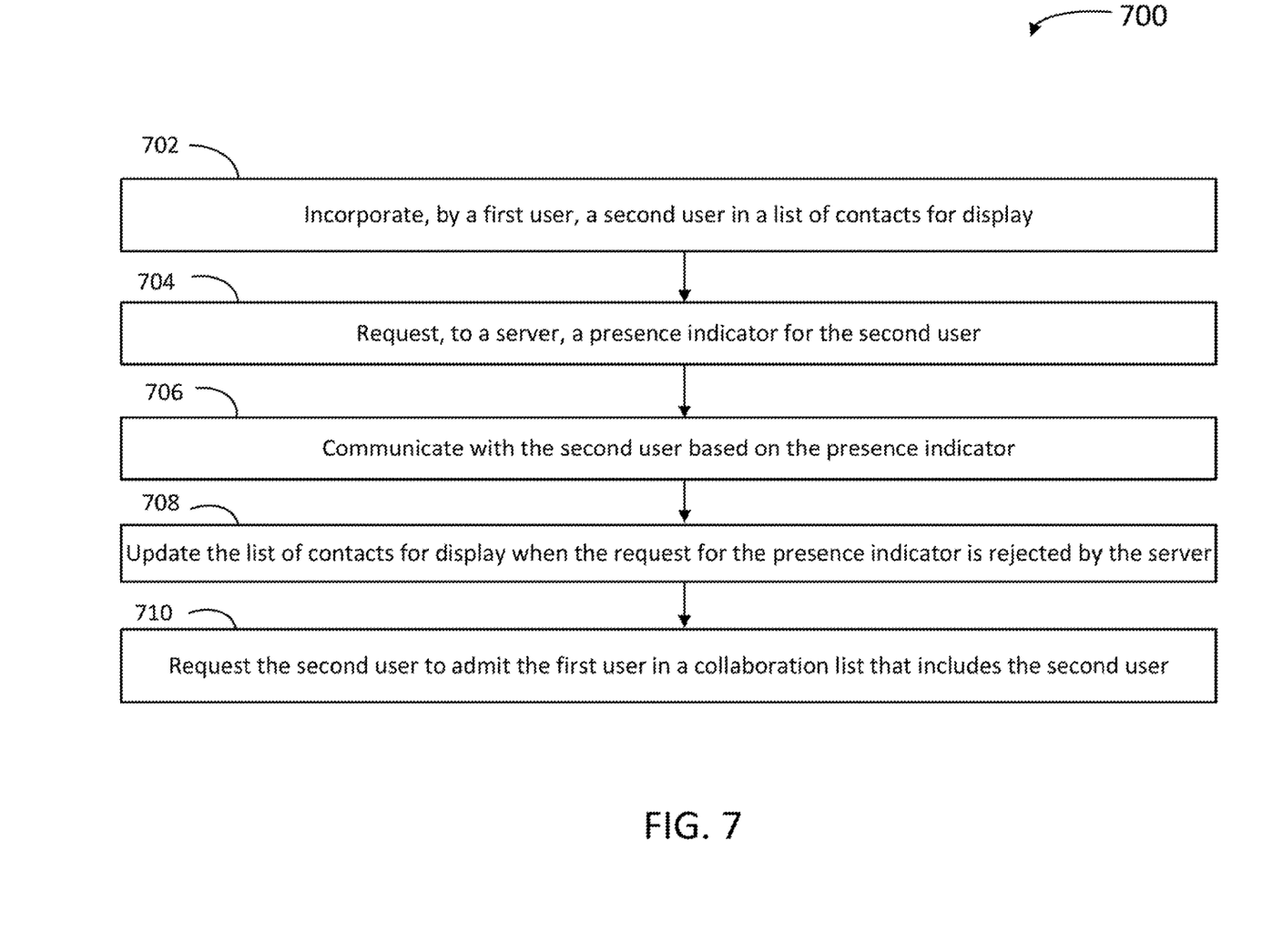
FIG. 7 is a flowchart illustrating steps in a method for participating in a presence detection in a server, according to some embodiments.

FIG. 7 is a flowchart illustrating steps in a method for participating in a presence detection in a server, according to some embodiments. Method 700 may be performed at least partially by any one of the network servers hosting a presence detection engine (e.g., presence detection engine 242), while communicating with any one of a plurality of client devices (e.g., servers 130 and client devices 110). At least some of the steps in method 700 may be performed by a computer having a processor executing commands stored in a memory of the computer (e.g., processors 212 and 236, memories 220 and 232). For example, at least some of the commands may be included in an application installed in a client device accessible by a user (e.g., application 222). Further, steps as disclosed in method 700 may include retrieving, editing, and/or storing files in a database that is part of, or is communicably coupled to, the computer (e.g., presence history log 244, database 252). Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes incorporating, by a first user, a second user in a list of contacts for display in the client device. In some embodiments, step 702 includes selecting the second user from a list in a collaboration application.

Step 704 includes requesting, to a server, a presence indicator for the second user.

Step 706 includes communicating with the second user based on the presence indicator. In some embodiments, step 706 includes communicating with a client device associated with the second user and that is not included in the presence indicator.

Step 708 includes updating the list of contacts for display when the request for the presence indicator is rejected by the server. In some embodiments, step 708 includes requesting the second user to admit the first user in a collaboration list that includes the second user.

Step 710 includes requesting the second user to admit the first user in a collaboration list that includes the second user.

Hardware Overview

Figure 8:
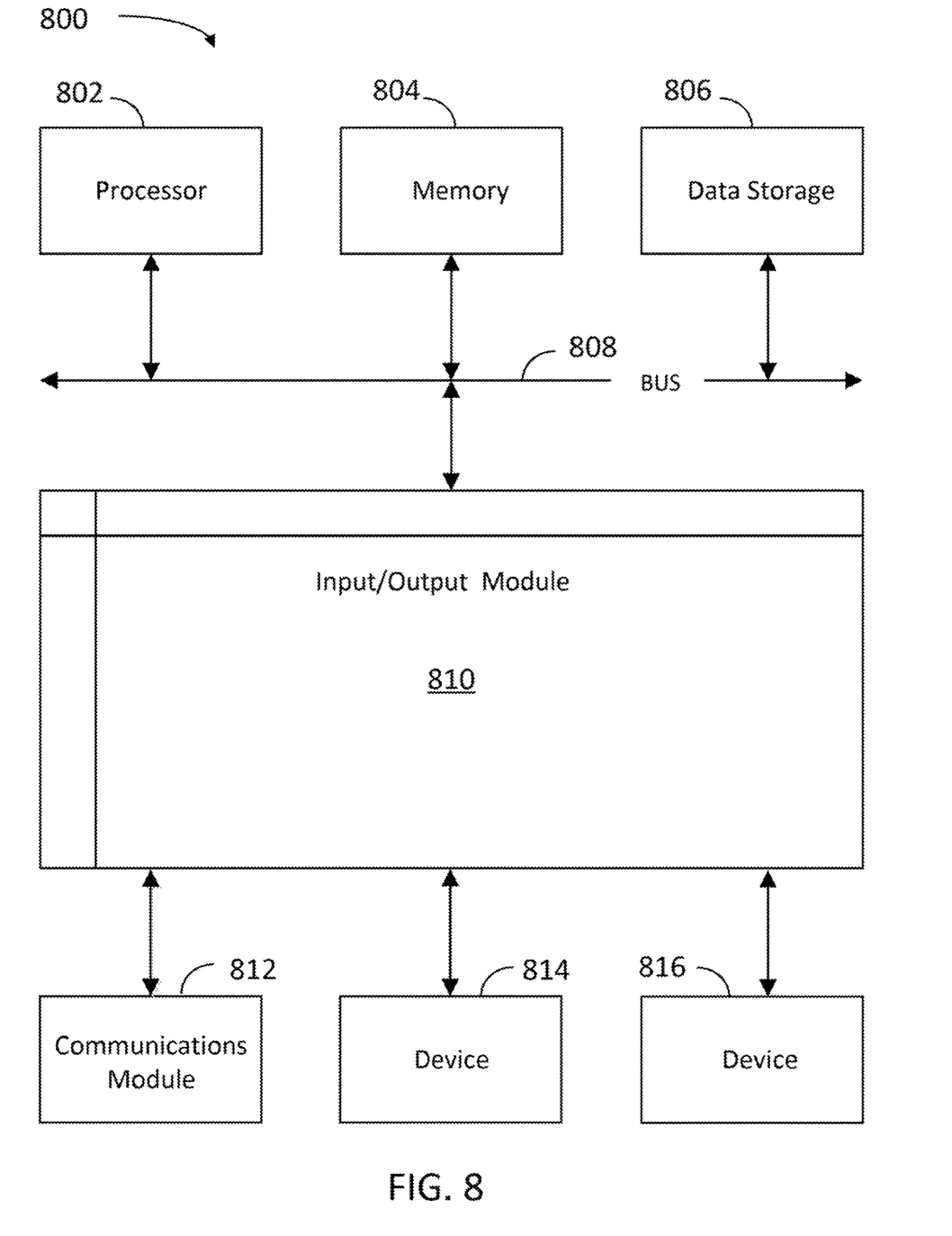
FIG. 8 is a block diagram illustrating an example computer system with which the client and server of FIGS. 1 and 2, and the methods of FIGS. 6 and 7 can be implemented, according to some embodiments.

FIG. 8 is a block diagram illustrating an exemplary computer system 800 with which the client device 110 and server 130 of FIGS. 1 and 2, and the methods of FIGS. 6 and 7 can be implemented. In certain aspects, the computer system 800 may be implemented using hardware or a combination of software and hardware, either in a dedicated server, or integrated into another entity, or distributed across multiple entities.

Computer system 800 (e.g., client device 110 and server 130) includes a bus 808 or other communication mechanism for communicating information, and a processor 802 (e.g., processors 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, a code that creates an execution environment for the computer program in question, e.g., code that constitutes processor firmware, a protocol stack, a database management system, an operating system, or a combination of one or more of them stored in an included memory 804 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, a special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as a LCD (liquid crystal display) monitor, for displaying information to the user.

According to one aspect of the present disclosure, the client device 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship with each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that include bus 808. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    receiving a first signal from a first client device registered with a first communication platform, the first signal indicative of a first activity of a first user associated with the first client device;
    receiving a second signal from a second client device not registered with the first communication platform, the second signal identified in an activity history log and indicative of a second activity of the first user associated with the second client device;
    storing the first signal and the second signal in an activity history log associated with the first user;
    determining, by a server, a presence status of the first user based on an analysis of the activity history log;
    configuring a presence indicator for the first user based on the presence status;
    receiving, from a second user, a request for the presence indicator for the first user;
    validating the request from the second user;
    verifying that the second user is associated with the first user in a collaboration list stored in a database and is authorized to request the presence indicator for the first user; and
    providing the presence indicator for the first user to the second user when the request is validated.

2. The computer-implemented method of claim 1, wherein the first communication platform or the second communication platform comprise at least one of a calendar server, a desktop computer, a mobile phone or a desk phone.

3. The computer-implemented method of claim 1, further comprising incorporating a type, a location and a transaction status of the first client device or the second client device in the presence indicator for the first user.

4. The computer-implemented method of claim 1, wherein at least one of the first signal and the second signal comprises a communication transaction selected from one of a start communication, an end communication, or a transfer communication, and configuring a presence indicator further comprises determining a presence status based on the communication transaction.

5. The computer-implemented method of claim 1, wherein the first signal comprises a presence information, and the second signal comprises a communication transaction, and configuring a presence indicator further comprises identifying the communication transaction.

6. The computer-implemented method of claim 1, wherein the activity history log comprises a user communication history information from multiple communication platforms associated with the first user, and the computer-implemented method further comprises updating an entry for a communication platform in the activity history log with the first signal from the first client device.

7. The computer-implemented method of claim 1, wherein configuring a presence indicator for the first user comprises determining a time lapse since the first user last updated a presence status.

8. The computer-implemented method of claim 1, wherein determining the presence status of the first user comprises receiving a desired presence status from the first user.

9. The computer-implemented method of claim 1, further comprising requesting the first signal from the first client device when the second user requests the presence indicator.

10. The computer-implemented method of claim 1, further comprising updating a first user presence status in the activity history log based on the presence indicator.

11. A system comprising:
    one or more processors; and
    a memory coupled to the one or more processors, the memory including instructions that, when executed by the one or more processors, cause the one or more processors to:
        receive a first signal from a first client device registered with a first communication platform, the first signal indicative of a first activity of a first user associated with the first client device;
        receive a second signal from a second client device not registered with the first communication platform, the second signal indicative of a second activity of the first user associated with the second client device;
        store the first signal and the second signal in an activity history log associated with the first user;
        determine, by a server, a presence status of the first user based on an analysis of the activity history log;
        configure a presence indicator for the first user based on the presence status;
        receive, from a second user, a request for the presence indicator for the first user;
        validate the request from the second user;
        verify that the second user is associated with the first user in a collaboration list stored in a database and is authorized to request the presence indicator for the first user; and
        provide the presence indicator for the first user to the second user when the request is validated.

12. The system of claim 11, wherein to receive the first signal from a first client device the memory includes instructions to host an application installed in the first client device.

13. The system of claim 11, wherein the memory further includes instructions to incorporate a type, a location, and a transaction status of the first client device or the second client device in the presence indicator for the first user.

14. The system of claim 11, wherein the activity history log comprises information from multiple communication platforms associated with the first user, and the one or more processors further execute instructions to update an entry for one communication platform in the activity history log with the first signal from the first client device.

15. The system of claim 11, wherein to configure a presence indicator for the first user the one or more processors execute instructions to determine a time lapse since the first user last updated a presence status.

16. The system of claim 11, wherein to determine the presence status of the first user the memory includes instructions to receive a desired presence status from the first user.

17. A computer-implemented method comprising:
   incorporating, by a first user through a first communication platform, a second user in a list of contacts for display;
   requesting, to a server, a presence indicator for the second user;
   communicating, through a second communication platform, with the second user based on the presence indicator wherein the first user is registered with the first communication platform and the second client device is not registered with the first communication platform;
   updating the list of contacts for display when a request for the presence indicator is rejected by the server, wherein the second communication platform is independent from the first communication platform;
   verify that the second user is associated with the first user in a collaboration list stored in a database; and
   verify that the second user is authorized to request the presence indicator for the first user.

18. The computer-implemented method of claim 17, wherein incorporating the second user in the list of contacts for display comprises selecting the second user from a list in a collaboration application.

19. The computer-implemented method of claim 17, wherein communicating with the second user based on the presence indicator comprises communicating with a client device associated with the second user, wherein the client device is not included in the presence indicator.

20. The computer-implemented method of claim 17, wherein updating the list of contacts for display comprises requesting the second user to admit the first user in a collaboration list that includes the second user.

* * * * *